United States Patent [19]

DeGraffenreid

[11] Patent Number: 4,715,954

[45] Date of Patent: * Dec. 29, 1987

[54] TRIANGULAR FILTER CARTRIDGE AND APPARATUS

[76] Inventor: Howard T. DeGraffenreid, P.O. Box 261, Inola, Okla. 74036

[ * ] Notice: The portion of the term of this patent subsequent to Sep. 23, 2003 has been disclaimed.

[21] Appl. No.: 910,693

[22] Filed: Sep. 22, 1986

Related U.S. Application Data

[63] Continuation-in-part of Ser. No. 632,451, Jul. 19, 1984, Pat. No. 4,613,438.

[51] Int. Cl.$^4$ .............................................. B01D 29/32
[52] U.S. Cl. .................................. 210/323.1; 210/346; 210/486; 55/529
[58] Field of Search ...................... 210/323.2, 331, 345, 210/346, 347, 486, 323.1; 55/482, 521, 529

[56] References Cited

U.S. PATENT DOCUMENTS

| | | | |
|---|---|---|---|
| 2,210,213 | 8/1940 | Long | 210/131 |
| 2,312,999 | 3/1943 | DeLangen | 210/323.2 |
| 2,587,903 | 3/1952 | Rood | 210/140 |
| 2,765,084 | 10/1956 | Tursky | 210/323.2 |
| 2,914,179 | 11/1959 | Foust | 210/323.2 |
| 2,919,030 | 12/1959 | Grant et al. | 210/488 |
| 3,223,244 | 12/1965 | Topol et al. | 210/247 |
| 3,241,679 | 3/1966 | Walter | 210/444 |
| 3,291,310 | 12/1966 | Marvel | 210/169 |
| 3,330,101 | 7/1967 | Murphy, Jr. | 55/529 |
| 3,476,252 | 11/1969 | Kudlaty | 210/323.2 |
| 3,556,300 | 1/1971 | Codo | 210/232 |
| 3,662,895 | 5/1972 | Traffnell et al. | 210/439 |
| 3,853,509 | 12/1974 | Leliaert | 55/529 |
| 3,880,757 | 4/1975 | Thomason | 210/167 |
| 4,057,502 | 11/1977 | Crumrine et al. | 210/440 |
| 4,058,463 | 11/1977 | Bartik | 210/317 |
| 4,065,392 | 12/1977 | Gammon | 210/282 |
| 4,295,525 | 10/1981 | Swift, Jr. et al. | 210/323.2 |
| 4,320,005 | 3/1982 | DeGraffenreid | 210/232 |
| 4,613,438 | 9/1986 | DeGraffenreid | 210/323.1 |

FOREIGN PATENT DOCUMENTS

| | | | |
|---|---|---|---|
| 1172099 | 10/1958 | France | 210/323.2 |
| 1425376 | of 1965 | France | |
| 626699 | 10/1961 | Italy | 210/323.2 |
| 14396 | 4/1914 | United Kingdom | |
| 117395 | 7/1918 | United Kingdom | 210/323.2 |
| 555902 | 3/1975 | U.S.S.R. | 210/323.2 |

Primary Examiner—Richard V. Fisher
Assistant Examiner—Wanda L. Millard
Attorney, Agent, or Firm—Jeffers, Hoffman & Niewyk

[57] ABSTRACT

An improved triangular filter cartridge and apparatus is provided comprising a generally cylindrical vessel having a plurality of generally triangularly shaped filter cartridges disposed therein. Each triangular filter cartridge has one of its substantially flat sides slightly spaced apart from and in direct facing relationship with the inner surface of the vessel, whereby a greater number of triangular filter cartridges can be compactly disposed within said vessel to increase the filtration capacity thereof.

4 Claims, 7 Drawing Figures

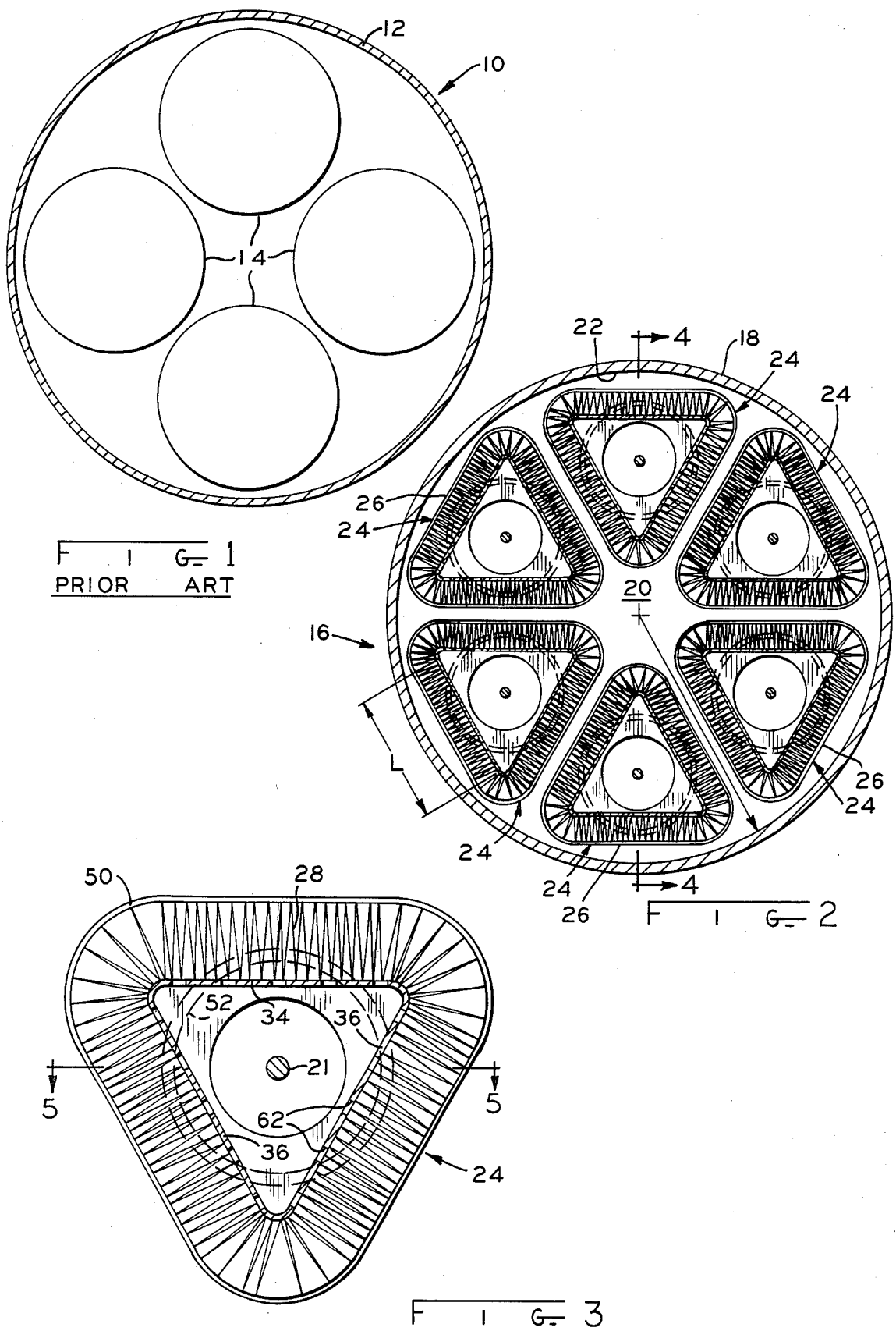

TRIANGULAR FILTER CARTRIDGE AND APPARATUS

CROSS-REFERENCE TO RELATED APPLICATION

This is a continuation-in-part of application Ser. No. 632,451, filed July 19, 1984, now U.S. Pat. No. 4,613,438

BACKGROUND OF THE INVENTION

This invention pertains to a fluid filter apparatus, and more particularly to an improved fluid filter apparatus including a generally cylindrically shaped vessel having a plurality of generally triangular shaped filter cartridges compactly disposed therein to increase filtration capacity. The invention also relates to a modified end cap for the cartridge to enable mounting on a mounting stool.

Typically, filtration apparatuses generally comprise a filter vessel of generally cylindrical shape containing a number of replaceable filter cartridges for filtering contaminants from a fluid. A typical filter cartridge comprises a filter medium or media, a support member for the medium, and an end cap on each end of the medium. These filter vessels are generally cylindrical shaped for ease of manufacturing, and a desired objective is to have as many replaceable filter cartridges as possible disposed therein to increase the filtration capacity of a vessel of given diameter.

Currently, most filter cartridges are also generally circular in shape, which has been dictated by the shape of the support member for the filter medium. Support members are required not only to withstand forces imposed by a differential fluid pressure transversely applied across the filter cartridges, but also the forces longitudinally applied by the device or mechanism for securely holding the filter cartridges in the vessel. Generally, these support members are in the form of a perforated tube, and are frequently assisted in providing support by a standpipe longitudinally disposed therein. The support member must be sufficiently strong to withstand the above-described transverse and longitudinal forces, and previously the most economical shape for a support member has been cylindrical, thereby resulting in the filter cartridges likewise being of generally cylindrical shape. Thus, if a user desires a filter vessel of specified diameter, then the number of filter cartridges is dictated thereby. Further, if a desired number of filter cartridges is specified so as to provide a desired filtration capacity, then the diameter of the filter vessel is dictated by the quantity and the overall diameter of the filter cartridges.

Clearly, one of the disadvantages of the above prior art filter apparatuses is that a filter vessel of specified diameter and specified filtration capacity may not be of sufficient size to house the requisite number of filter cartridges to provide the desired filtration capacity. For example, a typical filter vessel is one having a diameter of sixteen inches, and a typical filter cartridge is one having a diameter of six inches, and only four such filter cartridges can be suitably placed in such a vessel. If the four filtration cartridges are not adequate to provide the desired filtration capacity of such a size vessel, the apparatus will be unsatisfactory to the user.

Another disadvantage with the above filter apparatuses concerns the generally cylindrically shaped and thin-walled support members, which generally have low collapsing pressure thresholds, and therefore easily collapse under applied external pressures that exceed their thresholds. Circumventing this disadvantage requires the support member to be constructed with a thicker wall, thereby possibly necessitating decreasing the depth or thickness of the filter medium and its filtration capacity.

In view of the above, there clearly exists a need for filter cartridges having shapes that permit a greater number thereof to be housed within a filter vessel of specified diameter to provide a desired filtration capacity.

SUMMARY OF THE INVENTION

The present invention overcomes the disadvantages of the earlier described prior art fluid filter apparatuses by providing in one embodiment thereof an improved fluid filter apparatus comprising a plurality of generally triangularly shaped filter cartridges compactly disposed within a filter vessel.

By constructing the filter cartridges with a generally triangularly shaped outer peripheral surface defining three substantially flat sides, and disposing them within the cylindrical vessel such that one of the sides is slightly spaced apart from the vessel inner surface and in direct facing relationship therewith, more such filter cartridges can be disposed within the cylindrical vessel than circularly shaped cartridges, wherein the outer peripheral surface area of one circular cartridge is the same as that for one triangular cartridge, thereby increasing the filtration capacity of a filter vessel of specified diameter. Moreover, since more triangularly shaped filter cartridges can be housed within a cylindrical filter vessel of specified diameter, a more uniform flow distribution of fluid through the filter cartridges is realized.

Another advantage provided by the present invention is that of constructing the structural support member in a generally triangular shape similar to that of the filter medium. The collapsing pressure threshold of a generally triangularly shaped support member is greater than that of a cylindrically shaped support member, and therefore can withstand greater external forces. Furthermore, because of the higher collapsing pressure thresholds, triangularly shaped support members can be constructed with a relatively thinner wall than cylindrically shaped support members, thereby maximizing the depth or thickness of the filter medium and, accordingly, its filtration capacity.

In one form of the invention there is provided in a filter apparatus including a vessel having a generally cylindrical inner surface, a filter cartridge assembly for filtering a fluid and comprising a plurality of individually replaceable filter cartridges longitudinally disposed in the filter vessel each supported on a mounting stool. Each replaceable filter cartridge comprises an elongate permeable filter medium having oppositely disposed ends and a passage disposed therein, wherein the passage opens at one of the ends and communicates with the mounting stool. A porous support member is provided in supporting engagement against the filter medium, and an end cap is sealingly disposed between the filter medium and mounting stool. Each permeable filter medium has a generally triangularly shaped outer peripheral surface defining three substantially flat sides and rounded corners with one of the sides being slightly spaced apart from and in direct facing relationship with the vessel inner surface. The lower end cap has a triangular upper flange and a cylindrical lower skirt to mount to a standard mounting stool.

In another form of the invention there is provided a filter cartridge for filtering contaminants from a fluid comprising a permeable filter medium adapted for filtering contaminants from a fluid and having oppositely disposed ends and a passage disposed therein, wherein the passage opens at one of the ends. A porous support member is provided in supporting engagement with the filter medium and is adapted to have a fluid pass therethrough. An end cap is sealingly secured to the one end of the filter medium and has an opening therein communicating with the passage. The permeable filter medium has a triangularly shaped outer peripheral surface defining at least three substantially flat sides disposed at acute angles to each other with rounded corners disposed therebetween, whereby a fluid to be filtered passes through the support member and filter medium. The lower end cap has a cylindrical skirt so as to be mounted to a conventional mounting stool.

It is an object of the present invention to provide an improved filter apparatus including a vessel and a plurality of generally triangularly shaped filter cartridges compactly disposed therein.

Another object of the present invention is to provide an improved fluid filter apparatus including a vessel having a generally cylindrically shaped inner surface and a plurality of generally triangularly shaped filter cartridges, wherein each filter cartridge has one of its sides slightly spaced apart from and in direct facing relationship with the vessel inner surface to provide a greater number of filter cartridges in a vessel of specified diameter than cylindrically shaped cartridges.

Yet another object of the present invention is to provide a fluid filter apparatus of a specified size with increased filtration capacity.

A further object of the present invention is to provide a replaceable filtration cartridge of generally triangular shape.

A still further object of the present invention is to provide a plurality of generally triangularly shaped filter cartridges in a generally cylindrically shaped vessel in a space-saving arrangement.

Further objects of the present invention will appear as the description proceeds.

BRIEF DESCRIPTION OF THE DRAWINGS

The above-mentioned and other features and objects of this invention and the manner of attaining them, will become more apparent and the invention itself will be better understood by reference to the following description of an embodiment of the invention taken in conjunction with the accompanying drawings, wherein:

FIG. 1 is a transverse cross-sectional view of a prior art filter apparatus;

FIG. 2 is a transverse cross-sectional view of one embodiment of the present invention;

FIG. 3 is a sectional view of one of the filter cartridges;

DESCRIPTION OF A PREFERRED EMBODIMENT

Figure 4:
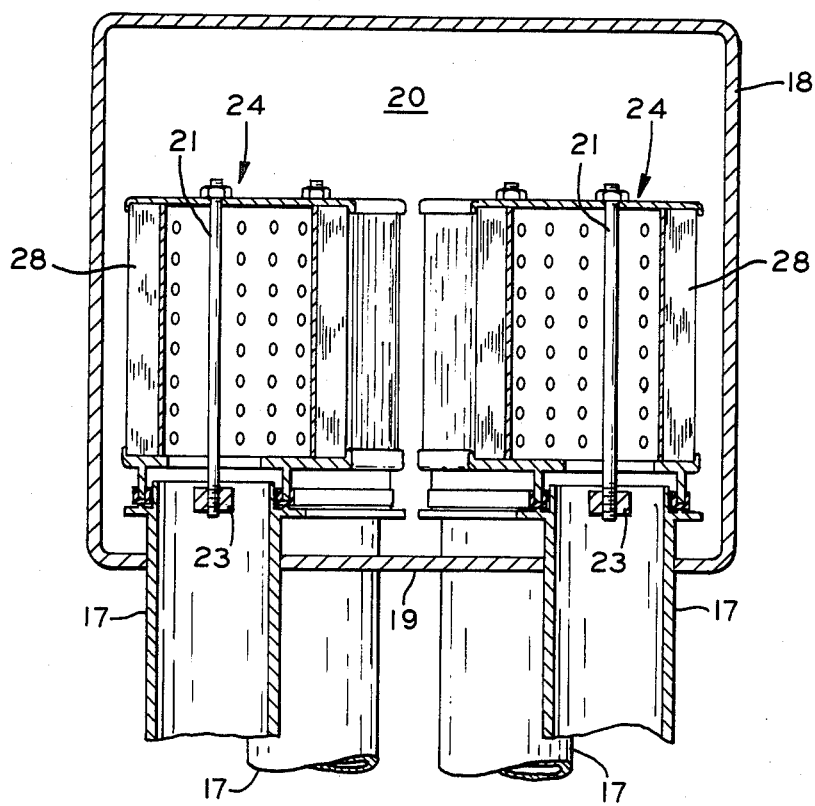
FIG. 4 is a sectional view of FIG. 2 taken along line 4—4 and viewed in the direction of the arrows.

Referring initially to FIG. 1, a prior art filter apparatus 10 is illustrated comprising vessel 12 and four filter cartridges 14, and in a typical cylindrical vessel 12. As can be clearly seen, only four cylindrically shaped filter cartridges 14 can be suitably disposed in vessel 12, thereby limiting the filtration capacity thereof.

In comparison, FIG. 2 illustrates a filter apparatus 16 according to the present invention comprising cylindrically shaped vessel 18 having an interior space 20 and a generally cylindrically shaped inner surface 22. In this illustration, vessel 18 contains 6 filter cartridges 24 according to the present invention, wherein each filter cartridge 24 has approximately the same outer peripheral surface area as each filter cartridge 14 in FIG. 1. Filter cartridges 24 are generally triangular in shape with one of their generally flat sides 26 slightly spaced apart from and in direct facing relationship with inner surface 22. Because of this geometric arrangement of filter cartridges 24 in vessel 18, a greater number are compactly disposed therein resulting in a greater filtration capacity for apparatus 16. Where the available space in which filter apparatus 16 is limited, thereby restricting the diameter size of vessel 18, the triangularly shaped filter cartridges 24 will provide a greater filtration capacity for that size vessel 18.

FIG. 4 illustrates the manner in which filter cartridges 24 are supported within the vessel 18. A plurality of mounting stools 17 extend through the lower end 19 of vessel 18 and support cartridges 24 on the upper ends thereof. Cartridges 24 are secured to mounting stools 17 by means of rods 21, which are threadedly connected to hubs or spiders 23 integral with the upper ends of mounting stools 17.

Figure 5:
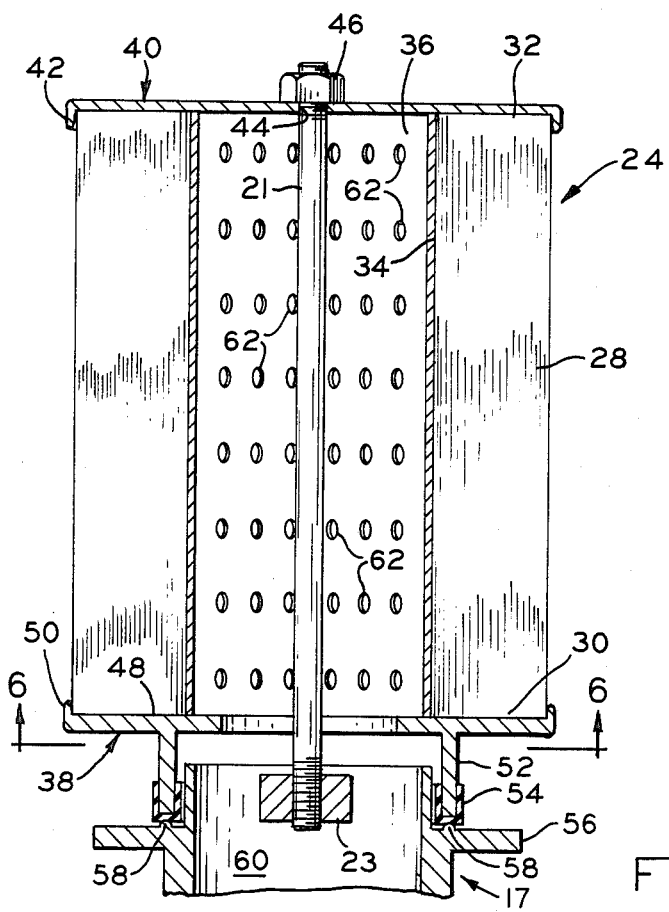
FIG. 5 is a broken-away perspective view of a filter cartridge of the present invention supported on a mounting stool.

Referring now to FIGS. 3 and 5, triangularly shaped filter cartridge 24 is elongate and comprises permeable filter medium 28 having oppositely disposed ends 30, 32 and passage 34 longitudinally extending therebetween. A support member such as thin-walled perforated support member 36 is disposed within passage 34 in supporting engagement against filter medium 28. A pair of generally triangularly shaped end caps 38, 40 are provided to be disposed on ends 30, 32 of filter medium 28. Upper end cap 40 comprises an outer flange 42 and an opening 44 through which rod 21 extends. Nut 46 is threaded on the end of rod 21 and clamps cartridge 24 to mounting stool 17. Lower end cap 38 comprises a base portion 48 having a triangular shaped outer flange 50, which is similar in dimension and shape to the flange 42 of upper end cap 40. If desired, upper and lower end caps 40 and 38 may be provided with inner triangular flanges (not shown). Lower end cap 38 further comprises a cylindrical skirt 52 which extends downwardly and is provided with a U-shaped gasket 54. Mounting stool 17 includes a flange 56 having an annular bead or knife edge 58 which indents into gasket 54 as rod 21 is clamped to mounting stool 17 thereby providing a fluid tight seal between the interior 60 of mounting stool and the interior 20 of vessel 18. The mounting stool sealing arrangement just described is disclosed in U.S. Pat. No. 4,320,005, which patent is expressly incorporated herein by reference. Inner perforated member 36 is provided with a plurality of openings 62, but may alternatively comprise a screen. Rounded corners 70, 72 and 74 between adjacent flat sides 64, 66 and 68 enable filter cartridges 24 of significantly larger outer surface area to be employed within a vessel of a given size.

As illustrated, filter medium 28 has three substantially flat sides 64, 66, 68 joined together by curved portions 70, 72, 74 defining triangularly shaped outer peripheral surface 76. Filter cartridge 24 having support member 36 disposed within passage 34 of filter medium 28 is designed for inside-out flow of a fluid to be filtered, wherein the fluid from mounting stool 17 first passes through perforated inner support member 36, filter medium 28 to the interior 20 of vessel 18 and then through an outlet (not shown) in vessel 18.

Filter medium 28 can be made of any suitable permeable material, including a moldable resin material having sufficient density. Further, filter medium 28 can be of any desired shape such as pleated, non-pleated, and a solid depth type, and multiple types of filter media may be used in a single filter cartridge 24. Also, sides 64, 66, 68 can be formed having a slight convex or concave contour, rather than being flat. As to the particular type of fluid to be filtered, the present invention contemplates filtering any type of fluid having any type or size of foreign particulate, or other contaminants whether solid or fluid.

End caps 38, 40 generally assist support member 36 in giving structural integrity to filter medium 28, and may be made of any suitable type of material, such as various plastic materials, for example, epoxy, polyesters, plastisol, metal, and fibrous cellulosic materials. Further, gasket 54 can be made of any suitable material for use with a filter cartridge 24.

Figure 7:
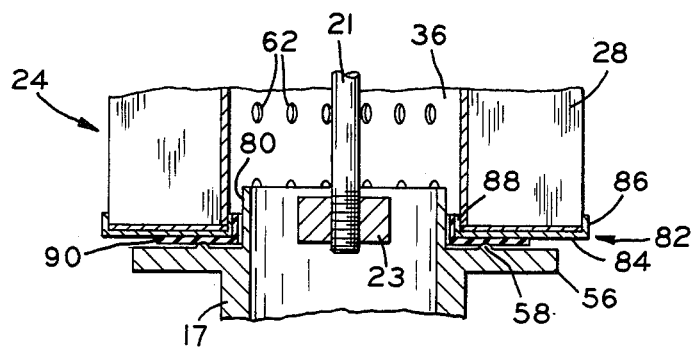
FIG. 7 is a fragmentary sectional view of a modified form of a filter cartridge according to the present invention supported on a mounting stool.

FIG. 7 illustrates a modified form of cartridge 24 wherein the minimum inside dimension of cartridge 24 is greater than the diameter of the upper skirt 80 of mounting stool 17. In this case, skirt 80 can fit within inner support member 36. Lower end cap 82 comprises a central portion 84, a triangular outer flange 86 and a triangular inner flange 88. Filter medium 28 is retained between flanges 86 and 88. Annular gasket 90 seals lower end cap 82 against the bead or knife edge 58 on mounting stool flange 56.

Figure 6:
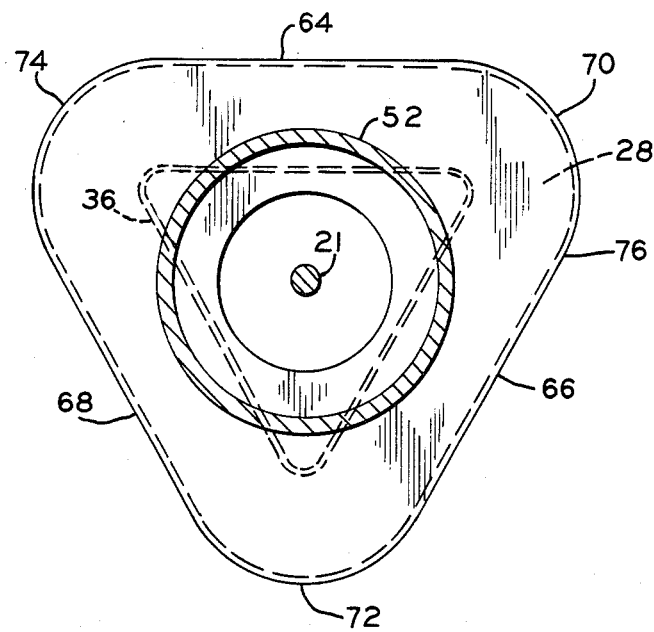
FIG. 6 is a sectional view of FIG. 5 taken along line 6—6 and viewed in the direction of the arrows.

In constructing the shape of filter cartridges 24 to compactly fit within vessel 18 as illustrated in FIG. 2, the following relationship exists between the outer radius R of a standard circular cartridge and the length L (FIG. 6) of sides 64, 66, 68 and the radius of curvature $R_o$ of curved portions 70, 72, 74:

$$2 \pi R = 2 \pi R_o + 3L$$

By determining filter cartridges 24 according to the above relationship, an arrangement of filter cartridges 24 can be disposed in vessel 18 as indicated in FIG. 2. The formula is used to determine the length L of sides 64, 66, 68 of a delta-designed cartridge, such as cartridge 24, with relation to a standard circular cartridge.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. A fluid filter apparatus comprising:

a vessel having a generally cylindrical inner surface and a longitudinal axis, a filter cartridge assembly for filtering a fluid and comprising a plurality of individually replaceable filter cartridges disposed in said filter vessel, each said replaceable filter cartridge comprising an elongate permeable filter medium including means defining a passage therein, said filter medium remaining in an essentially constant configuration throughout the filtering process, a porous support member being in supporting relationship with said elongate permeable medium, and upper and lower end caps secured to respective opposite ends of said elongate permeable filter medium, said elongate permeable filter medium having a generally triangularly shaped outer peripheral surface having three substantially flat elongate sides, adjacent ones of the elongate sides being joined by an arcuate portion so that each triangularly shaped filter cartridge has rounded corners, at least some of said filter cartridges being arranged in a generally circular pattern around the inner cylindrical surface of the vessel such that a flat side of each of said cartridges in the circular pattern is in direct facing relationship with said vessel inner surface and an opposite rounded corner of the cartridge faces radially inward toward the longitudinal axis of said vessel, adjacent flat sides of adjacent cartridges in the circular pattern generally facing each other, whereby the filter cartridges are closely spaced within said vessel thereby increasing filtration capacity; and a plurality of mounting stools within a lower portion of said vessel, said lower end cap comprising a generally cylindrical skirt depending downwardly and being sealingly supported against a respective said mounting stool, said skirt encircling and being concentric with an upwardly extending skirt portion of said mounting stool.

2. The filter apparatus of claim 1 wherein said support member and said passage have generally triangularly shaped transverse cross-sections.

3. The filter apparatus of claim 2 wherein said end caps are generally triangularly shaped.

4. A filter cartridge for filtering contaminants from a fluid comprising:

a permeable filter medium adapted for filtering contaminants from a fluid and having oppositely disposed ends and a passage disposed therein extending in an axial direction, said passage being open at one of said ends and being triangularly shaped in a plane perpendicular to said axial direction, a generally triangular shaped porous support member in said passage being in supporting engagement with said permeable filter medium and adapted to have a fluid pass therethrough, said porous support member being triangularly shaped in a plane perpendicular to said axial direction, and an end cap being sealingly secured to one end of said filter medium and having an opening therein communicating with said passage, said end cap comprising a cylindrical, downwardly extending skirt adapted to seat on a mounting stool, said permeable filter medium having a triangular shaped outer peripheral surface having three substantially flat sides disposed at acute angles to each other, adjacent ones of said sides being joined by an arcuate portion so that the cartridge has rounded corners.

* * * * *